United States Patent [19]

Nakagawa et al.

[11] Patent Number: 4,688,206
[45] Date of Patent: Aug. 18, 1987

[54] DEVICE FOR OPENING AND CLOSING A SHUTTER MEMBER OF A DISK CARTRIDGE

[75] Inventors: Kenzo Nakagawa, Kanagawa; Masayuki Suzuki, Tokyo, both of Japan

[73] Assignee: Sony Corporation, Tokyo, Japan

[21] Appl. No.: 905,491

[22] Filed: Sep. 10, 1986

[30] Foreign Application Priority Data

Sep. 23, 1985 [JP] Japan .................. 60-209537

[51] Int. Cl.[4] .................. G11B 23/02; G11B 5/12
[52] U.S. Cl. .................. 369/291; 206/312; 206/444; 360/133; 369/273
[58] Field of Search ............... 369/291, 273; 206/312, 206/444; 360/133, 99, 87

[56] References Cited

U.S. PATENT DOCUMENTS

| 4,492,351 | 1/1985 | Zöellner | 360/132 |
| 4,573,093 | 2/1986 | Obama et al. | 360/99 |
| 4,613,917 | 9/1987 | Shimaoka et al. | 360/97 |

FOREIGN PATENT DOCUMENTS 58-102370  6/1983  Japan ...................... 360/97

Primary Examiner—Steven L. Stephan
Attorney, Agent, or Firm—Lewis H. Eslinger; Alvin Sinderbrand

[57] ABSTRACT

A device is provided for opening and closing a shutter member of a disk cartridge containing a disk in a cartridge housing and adapted for insertion into a signal recording and/or reproducing apparatus that uses the disk as a magnetic recording medium. The cartridge housing has signal read and write apertures in its upper and lower walls. The shutter member is mounted so as to partially cover a front wall and the upper wall and lower wall of the cartridge housing for opening and closing the apertures, and has an engaging opening exposing the front and lower walls. The device includes a pair of opening and closing elements mounted on the signal recording and/or reproducing apparatus so as to be in the path of insertion of the disk cartridge. The elements are provided with engaging portions adapted for selectively engaging in the engaging opening of the shutter member and for being rotated when thrust by the disk cartridge. The opening and closing elements are so designed that their engaging portions strike each other to inhibit insertion of the disk cartridge when the latter is inserted with a reversed orientation so that its rear side opposes the opening and closing elements.

4 Claims, 10 Drawing Figures

DEVICE FOR OPENING AND CLOSING A SHUTTER MEMBER OF A DISK CARTRIDGE

BACKGROUND OF THE INVENTION

1. Field of the Invention

This invention relates to a device for opening and closing a shutter member of a disk cartridge used in conjunction with a signal recording and/or reproducing apparatus. More particularly, it relates to such device adapted for opening and closing the shutter member mounted movably to the disk cartridge for opening and closing the signal read or write apertures on the upper and lower surfaces of a disk cartridge containing a disk such as optical or opto-magnetic disk.

In the present specification, the term "signal recording and/or reproducing apparatus" means a magnetic, an optomagnetic or an optical apparatus in the sense that it makes use of an optical magnetic or an opto-magnetic disk as the signal recording medium.

In the present specification, the term "cartridge housing" generally means the casing devoid of the shutter member and not containing the disk, whereas the term "disk cartridge" means the assembly of the housing, the shutter member and the disk.

2. Prior Art

Heretofore, optical or magnetic disk used as signal recording media for the signal recording and/or reproducing apparatus are contained in a cartridge housing for protecting their signal recording surfaces, and are mounted in the recording and/or reproducing apparatus while they are contained in this manner in the cartridge housing. The cartridge housing containing the disk is provided on its upper and lower surfaces with apertures confronted by a pickup unit, such as optical pickup unit designed to effect signal reading or signal writing operations when the disk cartridge is inserted into the recording and/or reproducing apparatus. There is slidably mounted on the cartridge housing shutter member adapted for closing the apertures in order to prevent injury of or dust deposition on the disk in the cartridge housing due to opening of the apertures unless the disk cartridge is mounted in the signal recording and/or reproducing apparatus. For this reason, a device for opening and closing the shutter member is provided on the recording and/or reproducing apparatus making use of the above described disk cartridge.

In the above described recording and/or reproducing apparatus making use of the disk cartridge as signal recording medium, reading or writing of information signals becomes possible only when the disk cartridge is correctly introduced in the recording and/or reproducing apparatus, the shutter member is opened by the opening and closing device to open the signal read or write apertures, and the pickup unit faces the disk through these apertures. Thus, when the disk cartridge is inserted incorrectly and placed in the recording and-/or reproducing apparatus without the shutter member being opened by the opening and closing device, it becomes impossible to read or write information signals. In the case of the disk cartridge in which the apertures confronted by the disk table of the disk rotation drive unit and by the thrust member for thrusting the disk to the disk table are continuations of the signal read and write apertures and are also covered by the shutter member, it is not possible that the disk contained in the cartride be chucked to the disk rotation drive unit for rotation in unison therewith unless the shutter member is opened.

In the recording and/or reproducing apparatus making use of the aforementioned disk cartridge as the signal recording medium, such as the disk player, it is an essential requirement that the mounting of the disk cartridge in the disk mounting unit is enabled when the disk cartridge is correctly introduced into the device and that the mounting of the disk cartridge into the device is inhibited in case of incorrect insertion.

OBJECTS AND SUMMARY OF THE INVENTION

It is therefore an object of the present invention to provide a system for positively inhibiting incorrect insertion of the disk cartridge.

It is another object of the present invention to prevent incorrect insertion of the disk cartridge without providing a dedicated device therefor by imparting an incorrect insertion inhibit function to the opening and closing device thereby to avoid complication of the system.

It is a further object of the present invention to provide a system capable of protecting the disk cartridge by preventing incorrect insertion thereof as well as protecting the pickup unit of the recording and/or reproducing apparatus by preventing incorrect operation of the pickup unit.

For accomplishing these objects, the present invention provides an opening and closing device for a shutter member of the disk cartridge for use in conjunction with a magnetic signal recording and/or reproducing apparatus, said disk cartridge including a housing adapted for being inserted into said apparatus with a disk contained therein, said cartridge housing having in an upper surface and a lower surface thereof signal read or write apertures, said shutter member being mounted so as to partially cover a front wall, an upper wall and a lower wall of said cartridge housing for opening and closing said apertures, said shutter member having an engaging opening exposing said front wall and lower wall. The opening and closing device comprises a pair of shutter member opening and closing elements provided to the signal recording and/or reproducing apparatus so as to be in the path of insertion of said disk cartridge, said elements having engaging portions adapted for selectively engaging in said engaging opening and for being rotated by being thrusted by said disk cartridge, said opening and closing elements being so designed that the engaging portions thereof will strike each other to inhibit insertion of said disk cartridge when the disk cartridge is about to be inserted with the rear side thereof opposite to the front side covered by said shutter member in the leading position.

DESCRIPTION OF PREFERRED EMBODIMENTS

Reference is now made to the accompanying drawings showing a shutter opening and closing device for a disk cartridge according to a preferred embodiment of the present invention.

Disk Cartridge Construction (FIGS. 2, 3, 4 and 5)

A disk cartridge 1 to which the present invention is applied is explained.

Figure 2:
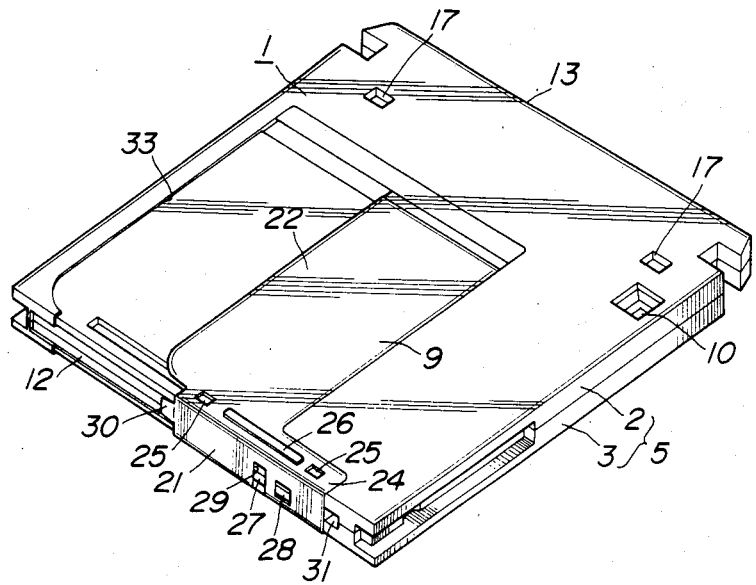
FIG. 2 is a perspective view, seen from above, of the disk cartridge applied to the present inventon.
Figure 3:
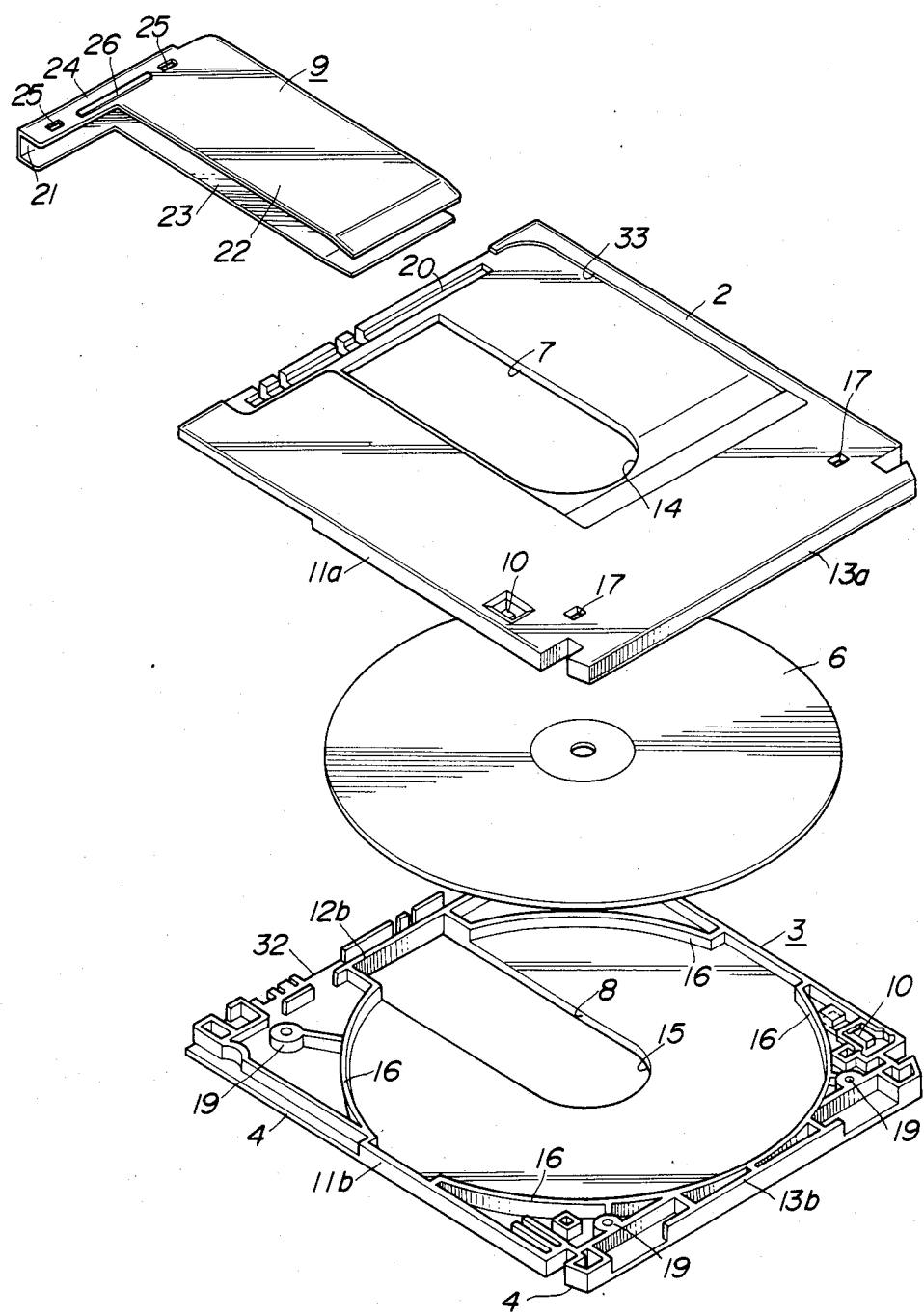
FIG. 3 is an exploded perspective view showing the disk cartridge.

As shown in FIGS. 2 and 3, the disk cartridge 1 is composed of a cartridge housing 5 formed by an upper half 2 and a lower half 3 that are abutted and secured to each other by a number of screws 4; a disk such as opto-magnetic disk 6 rotatably contained in the cartridge housing 5; and a shutter member 9. The upper and lower halves 2 and 3 are formed as by molding of synthetic material in the form of flat square plates. The shutter member is slidably mounted on the cartridge housing 5 and adapted for opening or closing window sections 7 and 8 intended for signal reading or writing and that are formed respectively in the upper half 2 and the lower half 3 making up the cartridge housing 5. To these window sections 7 and 8 faces an optical pickup unit, not shown, that is designed for writing or reading information signals on or from the disk 6.

The upper half 2 and the lower half 3 making up the cartrige housing 5 are configured symmetrically to each other except that writing protection members adapted for inhibiting writing on the disk 6 are disposed at the corresponding positions so that, when the upper and lower halves are abutted to and engaged with each other, the protection members 10 are disposed at opposite positions to each other. The upper half 2 and the lower half 3 are so constructed that, when they are abutted and connected to each other, there is defined therebetween a space of a size and shape sufficient to rotatably accommodate the disk 6. On the peripheries of the upper half 2 and the lower half 3 are formed upright wall sections 11a, 11b, 12a, 13a and 13b that make up left and right side wall members 11, 11, front wall member 12 and rear wall member 13 when the wall sections are abutted and connected to one another as shown in FIG. 3. At the center of the upper half 2 and the lower half 3 are formed disk table accommodating apertures 14, 15 confronted by a disk table of a disc rotation and drive unit that is provided to the recording and/or reproducing apparatus and that is designed to rotate the disk 6 contained in the cartridge proper 5. In continuation to these apertures 14, 15, there are formed the aforementioned window sections 7, 8 that are of the same width as the diameter of disk table insertion apertures 14, 15. There window sections 7, 8 are confronted by the optical pickup unit and used for signal reading and writing as indicated above. These window sections 7, 8 are formed as approximately rectangular apertures extending from the center of the upper half 2 and the lower half 3 to the front side wall member 12 to which the shutter member 9 is mounted. A plurality of arcuate rib sections 16 are formed on the inner sides of the upper half 2 and the lower half 3 and on a circumference of a circle that is centered about the apertures 14, 15 and that is slightly larger than the outer perimeter of the disk 6. When abutted to one another, these rib sections cooperate with one another to define wall sections delimiting the disk containing section while regulating the horizontal position of the disk 6.

On both side corners of the rear side wall member 13 of the upper half 2 and the lower half 3 opposite to the front wall member 12, there are formed reference holes 17, 17, 18, 18 that may be engaged by mating positioning pins provided to the recording and/or reproducing apparatus for setting the reference mounting position thereof with respect to the disk cartridge 1.

At back and in the vicinity of the reference holes 17, 17, 18, 18 in the upper half 2 and the lower half 3, and in the zone delimited by the circular rib sections 16 and the upright wall sections 11a, 11b, 12a, 12b, 13a and 13b at the both side corners on the front side of the disk cartridge 1, there are provided four female threaded sections 19 by which the upper half 2 and the lower half 3 are connected and secured to each other.

The upper half 2 and the lower half 3 thus provided with the female threaded sections 19 are connected together by screws 4 engaged in the female threaded sections 19 for defining the cartridge housing 5 rotatably containing the disk 6.

On the outer surfaces along the front sides of the upper half 2 and the lower half 3 connecting to the window sections 7, 8, there are formed slide guide slots 20 for sliding and guiding the shutter member 9 adapted for opening and closing the window sections 7 and 8.

The aforementioned shutter member 9 is formed by a metallic plate such as stainless steel plate in the form of a letter U in cross-section. It is slidably mounted by virture of the slide guide slots 20 provided to the upper and lower surfaces of the cartridge housing 5 in opposition to each other. The shutter member 9 is formed by a front web section 21 from the upper and lower sides of which an upper plate or upper shutter plate 22 and a lower plate or lower shutter plate 23 are integrally formed and extended in parallel with each other. These plates 22, 23 are of a size and shape sufficieint to cover the window sections 7, 8, and apertures 14 and 15 simultaneously. The front web section 21 and adjacent sections of the upper shutter plate 22 and the lower shutter plate 23 of the shutter member 9 cooperate with one another to define a slide guide section 24 for mounting the shutter member on the cartridge housing 5. The slide guide section 24 is extended from one side of each of the upper and lower shutter plates 22, 23 along the respective slide guide slot 20. Thus the shutter member 9 is approximately in the form of a letter U when seen in plan view.

On the upper and lower surfaces of the slide guide section 24 of the shutter member 9, there are formed opposing guide tabs 25, 25 for extending inwardly into and being guided along the slide guide slot 20. The slide guide section 24 is formed with a rib 26 by drawing between the guide tabs 25, 25 in order to prevent flexure of the slide guide section 24 in a direction normal to the direction of thickness of the disk cartridge 1 otherwise caused as a result of setting the width of the section 24 so as to be longer than that of the upper or lower shutter plates 22, 23.

Figure 5:
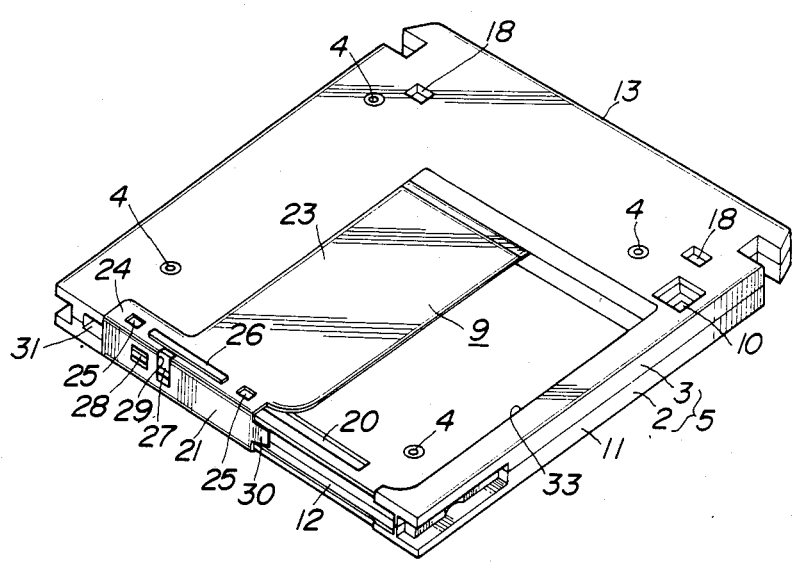
FIG. 5 is a perspective view, seen from below, of the disk cartridge.

The shutter member 9 is formed, towards one side of the front wall section 21 thereof, with a tab 28 to be engaged by a locking member 27 of the cartridge housing 5 when the shutter member 9 is at the first position of closing the window sections 7, 8. As shown in FIG. 5, the shutter member 9 is also formed with an opening 29 extending in the front web section 21 and in the lower shutter plate 23 so as to be selectively engaged by protuberant shutter member opening and closing pins implanted at the foremost part of shutter opening and closing arms in turn provided to the recording and/or producing apparatus as will be described. In effect, the opening 29 is an L-shaped slot extending in the front web section 21 and in the lower shutter plate 23. In this slot is engaged the aforementioned shutter member opening and closing pin of the shutter member opening and closing arm in a direction normal to the direction of thickness of the disk cartridge 1. The opening 29 is provided at a position which, when the shutter member 9 is in the first position of closing the window sections 7, 8 and apertures 14 and 15, is displaced from the widthwise center of the cartridge housing and in register with a flat section 27c (FIG. 4) towards the free end of the locking member 27 provided to the one corner of the front side of the cartridge housing 5. At the other end of the front web section 21 of the shutter member 9 opposite to the opening 29, the shutter member 9 is formed with a guide section 30 which is bent inwardly such that, when the disk cartridge 1 is inserted into the recording and/or reproducing device, the opening and closing pin not used for opening or closing the shutter member and not engaged in the opening 29 may easily be deviated as it rides on the front web section 21.

The thus-constructed shutter member 9 is mounted with its slide guide section 24 overlying the respective upper surfaces and the front wall member 12 of the upper half 2 and the lower half 3 of the cartridge 5, with the guide tabs 25, 25 being engaged and guided along the slide guide slot 20 in the cartridge housing 5. The cartridge 5 is formed at the front wall member 12 thereof with a groove 31 which is formed by partially recessing the front wall section 12 towards the interior of the cartridge housing 5 and in which there are slidably disposed the tab 28 and the projecting shutter member opening and closing pins of the shutter member opening and closing arms to be later described. The portion of the lower half 3 defining the groove 31 is removed for delimiting a cut-out 32 (FIG. 3) in which there are intruded and slid the projecting opening and closing pins of the opening and closing arms to be later described.

To the widthwise sides of the apertures 7, 8, 14 and 15 on the upper and lower surfaces of the cartridge proper 5, opposite to the extension of the slide guide section 24, there are formed recesses 33 (FIGS. 2 and 5) for delimiting the extent of sliding movement of the shutter member 9, inclusive of the peripheries of the window sections 7, 8 and apertures 14, 15. Within the extent of the recesses 33, the shutter member 9 is movable between the first position of closing the window sections 7, 8 and apertures 14, 15 and the second position of opening these window sections and apertures.

Figure 1:
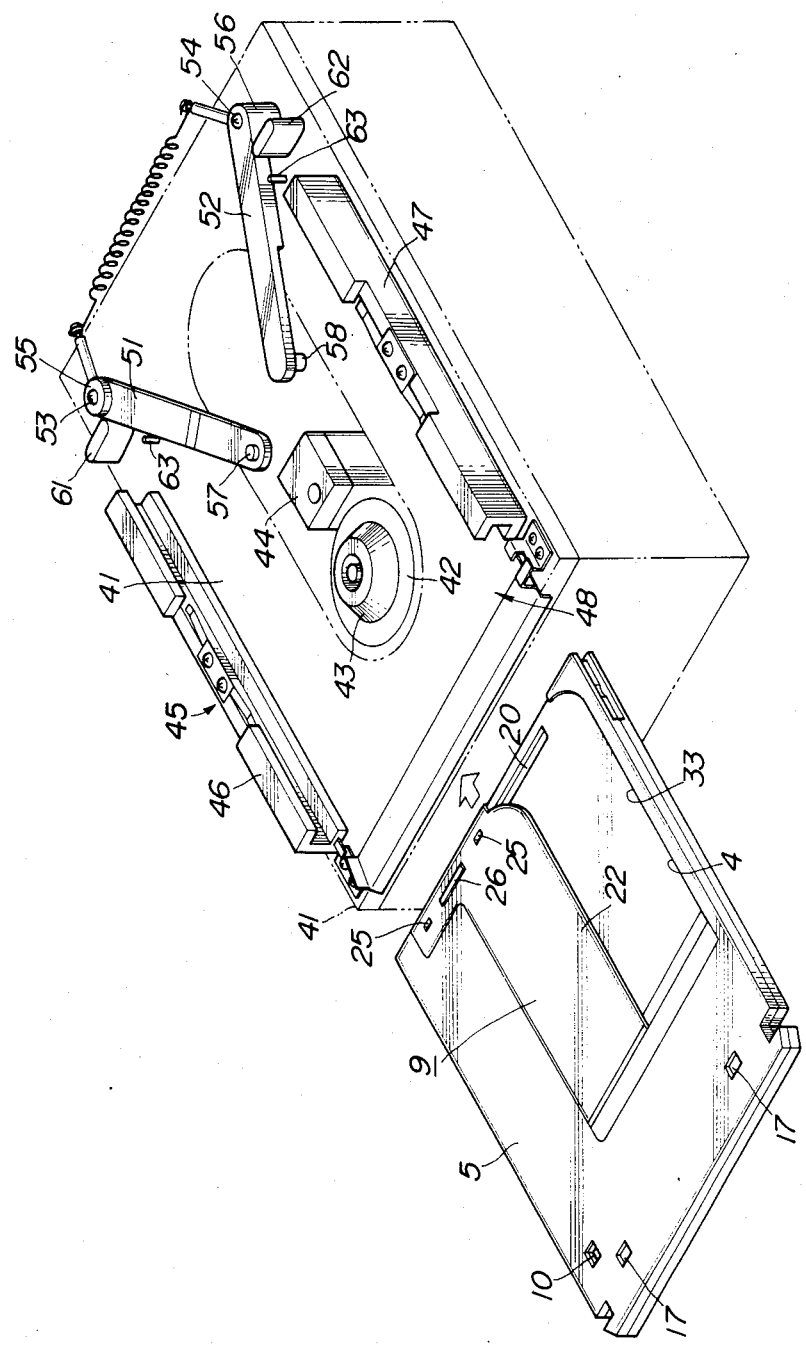
FIG. 1 is a perspective view showing the shutter member opening and closing device according to the present invention.
Figure 4:
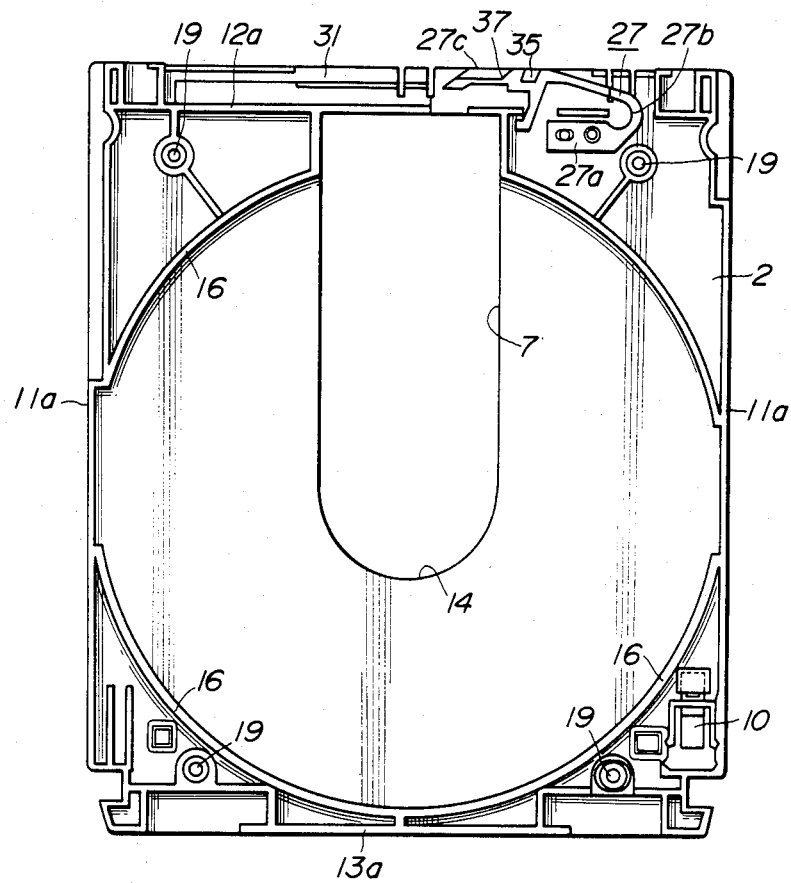
FIG. 4 is a plan view showing the inside of the upper half of the disk cartridge.
Figure 6:
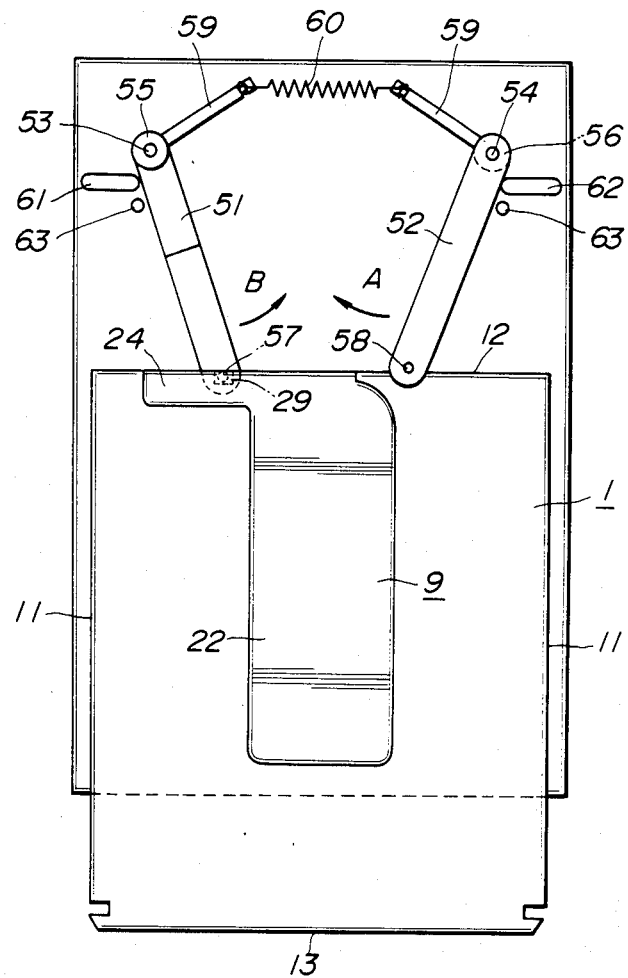
FIG. 6 is a plan view showing the disk cartridge inserted into the shutter member opening and closing device.
Figure 7:
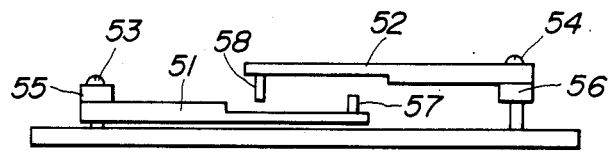
FIG. 7 is a plan view showing the first and second shutter member opening and closing arms.
Figure 8:
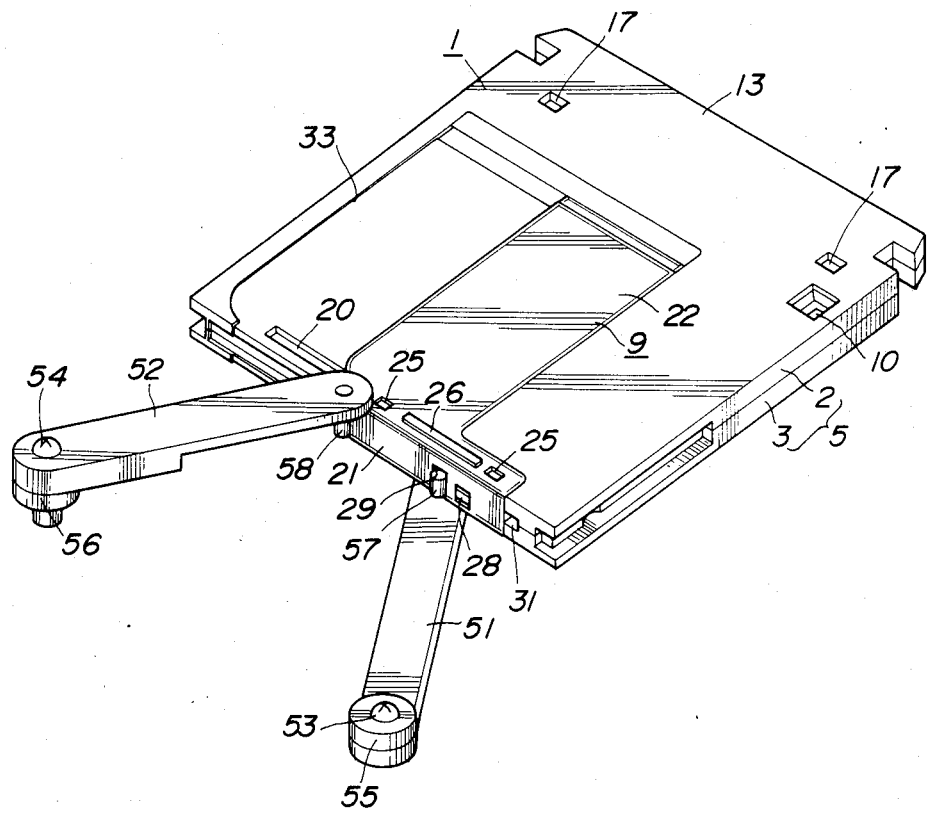
FIG. 8 is a perspective view showing the state in which the disk cartridge is abutted and engaged with the first and second shutter member opening and closing arms.
Figure 9:
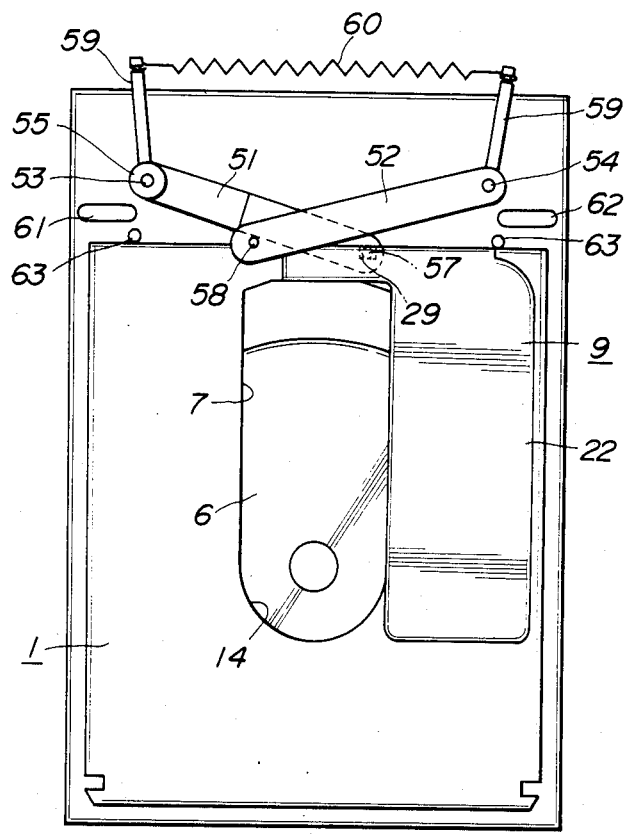
FIG. 9 is a plan view showing the state in which the shutter member of the disk cartridge is opened.

At the inner corner towards the front side of the upper half 2 of the disk cartridge 1, there is mounted the locking member 27 molded from synthetic material and having a locking recess 35 adapted for locking the shutter member 9. In this recess is engaged the tab 28 for locking the shutter member 9 when the shutter member 9 is in the first position of closing the window sections 7, 8 and apertures 14 and 15, as shown in FIG. 4. Between a bottom section 27a for mounting the locking member to the upper half 3 and the flat section 27c there is a resilient deflective section 27b in the form of a hemicircle of the locking member 27. At the free end side of the locking recess 35 which is engaged by the tab 28 of the shutter member 9, the flat section 27c is formed with a recess or cut-out 37 in which the tab 28 is inserted and deviated during movement of the shutter member 9. Construction of the Recording and/or Reproducing Apparatus (FIG. 1, 6 and 7).

The recording and/or reproducing apparatus into which the above described disk cartridge 1 is inserted and mounted is hereafter explained.

In this recording and/or reproducing apparatus is provided a disk mounting section or unit 41 which is provided with a set of heightwise positioning pins, not shown, for engaging in the reference apertures 17, 17, 18 and 18 in the disk cartridge 1 for heightwise positioning of the cartridge 1 and another set of pins, also not shown, for supporting the surface of the disk cartridge 1. It is by means of this disk mounting section 41 that the disk cartridge 1 is mounted to the signal recording and/or reproducing apparatus with positioning in the horizontal and heightwise directions. As shown in FIG. 1, the disk mounting section 41 is provided with a disk rotation and drive unit 43 provided in turn with a disk table 42 adapted for driving the disk 6 in the disk cartridge 1 into rotation, and a chucking device, not shown, for clamping the disk 6 to the disk table 42 so that the disk 6 may be rotated in synchronism with the disk table 42. There is also provided the aforementioned optical pickup unit 44 in facing relation to the lower side of the disk cartridge 1 mounted to the disk mounting unit 41. The pickup unit is movable between the inner and outer peripheries of the disk 6 for writing or reading information signal on or from the signal recording surface of the disk 6.

The disk mounting section 41 in the recording and/or reproducing apparatus is provided with a frame 45 adapted for supporting the disk cartridge 1 which is inserted through the disk inserting and removal opening in the outer casing of the recording and/or reproducing apparatus. The supporting frame 45 is vertically movably supported on a chassis provided with the aforementioned disk rotation and drive unit 43 and the pickup unit 44. The supporting frame 45 is in the form of a flat square plate having a width approximately equal to the width of the disk cartridge 1. On both sides of the supporting frame 45, there are provided channel-shaped supporting sections 46, 47 adapted for insertion and supporting of the both sides of the disk cartridge 1. The front side of supporting frame 45 is designed as an opening 48 for reception of the disk cartridge 1. The supporting frame 45 is supported vertically movably on the chassis so that, during the insertion and removal of the disk cartridge 1, the opening 48 is in a facing relation to the disk insertion and removal opening and that during use of the disk cartridge 1, supporting frame 45 is in the lower position in which it is supported and positioned by the sets of the supporting and positioning pins.

At the inner side of the supporting frame 45 opposite to the reception opening 48 for the disk cartridge 1, the first and second shutter member opening and closing arms 51, 52 are provided in opposition to the inserting direction of the disk cartridge 1. These shutter member opening and closing arms 51 and 52 are provided at the proximate ends thereof with tubular sections 55, 56 passed by supporting shafts 53, 54 implanted on the inner corners of the supporting frame 45. At the distal ends of the shutter member opening and closing arms 51, 52, there are implanted first and second shutter member opening and closing pins 57, 58 for selectively engaging in the opening 29 in the shutter member 9 of disk cartridge 1. The length of the shutter member opening and closing arm 51 between the tubular section 55 and the pin 57 is selected to be equal to that of the arm 52 between the tubular section 56 and the pin 58.

The supporting shafts 53, 54 are implanted symmetrically in the widthwise direction with the rotational center of the disk rotation drive unit 43 as center, with the rotational center being on the centerline along which the disk cartridge 1 is inserted into the frame 45. The first and second shutter member opening and closing arms 51, 52 are pivotally mounted by the supporting shafts 53, 54 passed through the tubular sections 55, 56 such that the first and second shutter member opening and closing pins 57, 58 are projected in the mutually opposite directions. Since the first and second shutter member opening and closing arms 51, 52 are of the same length and mounted by the supporting shafts 53, 54 that are symmetrical with respect to the centerline along which the disk cartridge 1 is inserted, the arms 51, 52 are mounted symmetrically with the center of insertion of the disk cartridge 1 as center.

The length of the first and seceond shutter member opening and closing arms 51, 52 is selected so that, when they are rotated about the supporting shafts 53, 54 in directions for approaching each other, the trajectories of the first and second shutter member opening and closing pins 57, 58 implanted on the distal ends of the arms 51, 52 strike each other in the course of rotation of the arms 51, 52.

The first and second shutter member opening and closing arms 51, 52 are also mounted to the supporting shafts 53, 54 with a heightwise gap or spacing larger than the thickness of the disk cartridge 1, in order that the first or second shutter member opening and closing pin 57 or 58 is engaged in the opening 29 of the shutter member 9 at the time of insertion of the disk cartridge 1 without the opening and closing arms 51, 52 abutting on the disk cartridge 1.

Also, while the first shutter member opening and closing pin 57 has a length sufficient to be engaged in the opening 29 in the shutter member 9 of the disk cartridge 1, the second shutter member opening and closing pin 58 is longer in length then the first shutter opening and closing pin 57, s shown in FIG. 7, such that the pins 57, 58 overlap in the heightwise direction thereof. Thus, when the first and second shutter member opening and closing arms 51, 52 are rotated simultaneously in planes parallel to the plane of the disk cartridge 1, the first and second pins 57, 58 impinge on each other at the crossing point of the trajectories thereof.

It is noted that, for the first and second pins 57, 58 to strike each other in the above described manner, these pins may be of same height since it only suffices that the pins 57, 58 overlap in the heightwise direction.

The first and second shutter member opening and closing arms 51, 52 are biased so as to rotate in directions away from each other or towards the outer sides of the frame 45 by a tension spring 60 retained by shafts 59, 59 projecting from the tubular sections 55, 56 in directions substantially at right angles with the shutter member opening and closing arms 51, 52. The rotational biasing positon of the first shutter member opening and closing arm 51 is regulated by an arm regulating member 61 such that, when the disk cartridge 1 is introduced into the recording and/or reproducing apparatus with the upper surface of the disk cartridge 1 directed upwards and the first signal recording surface of the disk 6 facing the optical pickup unit 44, the first pin 57 on the distal end of the arm 51 is positioned facing to the opening 29 of the shutter member 9. In like manner, the rotational biasing position of the second shutter member opening and closing arm 52 is regulated by a second arm regulating member 62 such that, when the disk cartridge 1 is introduced into the recording and/or reproducing apparatus with the lower surface of the disk cartridge 1 directed upwards and the second signal recording surface of the disk 6 facing the optical pickup unit, the second pin 58 implanted on the distal end of the arm 52 is positioned facing to the opening 29 of the shutter member 9.

Towards both sides of the frame 45 and in the vicinity of the first and second arm regulating members 61, 62, there are implanted a pair of regulating projections 63, 63, adapted for regulating the limit position of insertion of the disk cartridge 1. When the disk cartridge 1 is inserted until abutment thereof with the regulating projections 63, 63, the shutter member 9 is moved from its first position to its second position by the operation of the first and second shutter member opening and closing arms 51, 52 for completely opening the signal read and write window sections 7 and 8. Opening Operation for the Shutter Member 9 of the Disk Cartridge 1.

The operation of opening the shutter member 9 by the shutter member opening and closing device having the aforementioned first and second shutter member opening and closing arms 51, 52 is now explained. Opening Operation for the Shutter Member 9 when the Disk Cartridge 1 is inserted with the First Surface of the Disk 6 facing to the Optical Pickup Unit (FIGS. 1, 6, 8 and 9).

It is first assumed that, as shown in FIG. 1, the disk cartridge 1 is inserted through the disk inserting and removal opening with the upper surface of the disk cartridge 1 facing upwards and with the first signal recording surface of the disk 6 facing to the optical pickup unit. As shown in FIGS. 6 and 7, the first shutter member opening and closing pin 57 at the distal end of the first shutter member opening and closing arm 51 is engaged at this time in the opening 29 in the shutter member 9. At this time, the first shutter member opening and closing pin 57 thrusts the flat section 27c of the locking member 27 of the cartridge 5 for displacing the locking member 27 for disengaging the tab 28 from the cut-out 35 of the locking member 27 to permit sliding movement of the shutter member 9.

On the other hand, the second shutter member opening and closing pin 58 at the distal end of the second shutter member opening and closing pin 52 rides on the inclined guide section 30 formed on the other end of the shutter member 9 such that the arm 52 is rotated in the direction indicated by the arrow A in FIG. 6 against the urging of the tension spring 60 in advance of rotation of the first arm 51. More in detail, the second arm 52 is rotated in advance of rotation of the first arm 51 by a time interval resulting from engagement of the first pin 57 on the first shutter member opening and closing arm 51 in the opening 29. As the disk cartridge 1 is inserted further in this state, the first shutter member opening and closing arm 51 is also thrust by the disk cartridge 1 so that the arm starts its rotation against urging of the tension spring 60 in the direction indicated by the arrow B in FIG. 6. The first shutter member opening and closing pin 57 is engaged at this time in the opening 29 of the shutter member 9, and the shutter member 9 is unlocked, such that the above described rotation of the first shutter member opening and closing arm 51 causes the shutter member 9 to be shifted from the first position of closing the apertures 7, 8, 14 and 15 towards the second position of opening these apertures 7, 8, 14 and 15. As the disk cartridge 1 is inserted further until abutment thereof with the regulating projections 63, 63, the shutter member 9 is completely shifted by the first arm 51 to the second position of opening the apertures 7, 8, 14 and 15.

On the other hand, the second shutter member opening and closing arm 52, rotated in advance of the first arm 51, is rotated with the second shutter member opening and closing pin 58 thereof sliding on the front wall section 21 of the shutter member 9, starting from the inclined guide section 30. At this time, the first and second shutter member opening and closing arms 51, 52 are rotated with relative shift in timing in the initial movement thereof and thus without the first and second shutter member opening and closing pins 57, 58 striking each other. The Operation of Opening the Shutter Member When the Disk Cartridge 1 is inserted with the Second Surface of the Disk 6 Facing to the Optical Pickup Unit.

The state of operation of inserting the disk cartridge 1 with the second surface of the disk 6 facing to the optical pickup unit is the reverse of the above described state of operation of inserting the disk cartridge with the first surface of the disk 6 facing to the optical pickup unit. Thus the second shutter member opening and closing pin 58 at the distal end of the second arm 52 is engaged in the opening 29 of the shutter member 9, whist the first shutter member opening and closing pin 57 at the distal end of the first shutter member opening and closing arm 51 rides on the inclined guide section 30 at the other end of the shutter member 9. The first shutter member opening and closing arm 51 is rotated against the urging of the tension spring 60 in advance of rotation of the second arm 52.

When the disk cartridge 1 is inserted until abutment thereof with the regulating projections 63, 63, the shutter member 9 is shifted to the second position by the second shutter member opening and closing arm 52 for completely opening the apertures 7, 8, 14 and 15.

The shutter member opening operation is otherwise the same as that described hereinabove with the first surface of the disk 6 facing to the optical pickup unit except that the operation of the first arm 51 and that of the second arm 52 are exchanged with each other. Therefore, the detailed description is omitted for simplicity.

Figure 10:
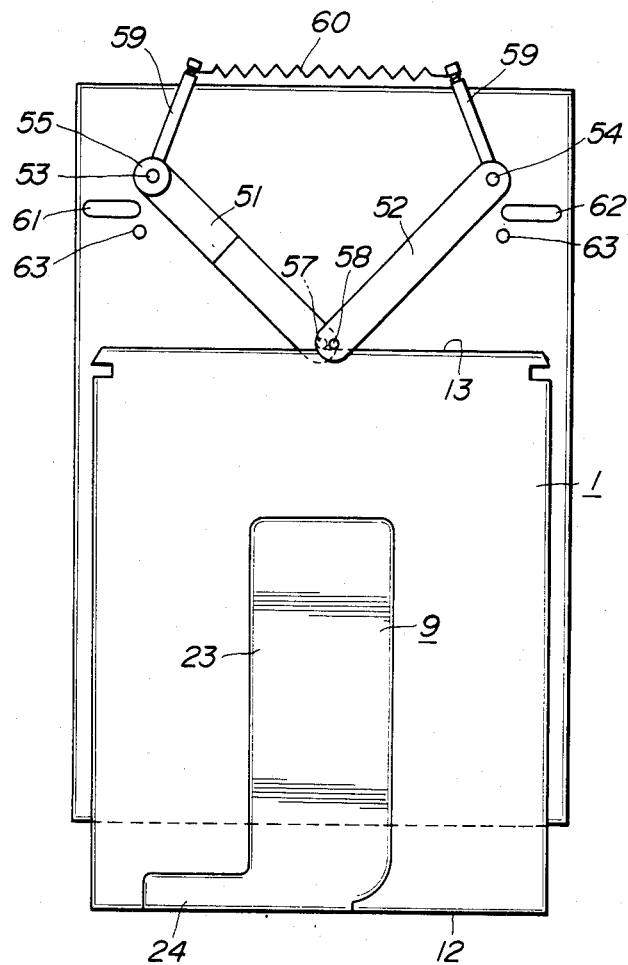
FIG. 10 is a plan view showing the state in which the disk cartridge is inserted from the rear side.

State of Incorrect Insertion of Disk Cartridge (FIG. 10)

When the disk cartridge 1 is inserted through error with the side of the rear wall 13 opposite to the shutter member 9 in the leading position, the first and second shutter member opening and closing pins 57, 58 at the distal ends of the first and second arms 51, 52 abut on the flat rear wall 13 of the disk cartridge 1. Since the first and second shutter opening and closing pins 57, 58 are pressured by the common rear wall 13 of the disk cartridge 1 in abutment therewith, the first and second arms 51, 52 start to rotate simultaneously. The result is that the first and second shutter member opening and closing pins 57, 58 abut on each other at the point of intersection of the rotational trajectories of the first and second arms 51, 52 as shown in FIG. 10, for inhibiting further rotation of the first and second shutter member opening and closing arms 51, 52 and hence preventing the incorrect insertion of the disk cartridge.

According to the present invention, as described above, when the disk cartridge 1 is inserted at the rear side opposite to the front side covered by the shutter member 9, the shutter member opening and closing arms 51 and 52 provided in the way of insertion of the disk cartridge and having the pins 57 and 58 to be selectively engaged in the opening 29 in the shutter member of the disk cartridge are rotated to cause the pins to strike each other such that incorrect insertion of the disk cartridge is prevented from occurring through inhibition of further rotation of the shutter member opening and closing arms and hence the insertion of the disk cartridge.

The above described system for inhibiting the incorrect insertion of the disk cartridge is provided to the opening and closing device for the shutter member so that a simplified system is provided for preventing the disk cartridge from being inserted incorrectly. In addition, since the disk cartridge is prevented in this manner from being introduced incorrectly, it is possible to protect the disk cartridge and the pickup unit of the recording and/or reproducing apparatus through inhibition of the incorrect operation of the unit, while also protecting the disk rotation drive unit or the disk chucking unit.

What is claimed is:

1. In a signal recording and/or reproducing apparatus making use of a cartridge including a housing containing a disk as a signal recording medium, said cartridge housing having in an upper wall and a lower wall thereof signal read or write apertures, and a shutter member mounted movably on said housing so as to partially cover a front wall and said upper wall and lower wall of said cartridge housing and adapted for opening and closing said apertures, said shutter member having an engaging opening exposing said front wall and lower wall, said cartridge being insertable into the signal recording and/or reproducing apparatus along a predetermined path of insertion, and said apparatus including a device for opening and closing the shutter member, said device comprising:

a pair of shutter member opening and closing elements provided to the signal recording and/or reproducing apparatus so as to be in said path of insertion of said disk cartridge, said elements being rotatably mounted, having engaging portions adapted for selectively engaging in said engaging opening, and being rotated in response to a force applied by said disk cartridge when said disk cartridge moves along said path of insertion, said shutter member opening and closing elements being so designed that portions of said opening and closing elements strike each other to inhibit further movement of each other and to inhibit further movement of said disk cartridge along said path of insertion when the disk cartridge is inserted with a rear wall of said housing opposite to said front wall partially covered by said shutter member in opposing relation to said opening and closing elements.

2. A device as claimed in claim 1 characterized in that said shutter member opening and closing elements are rotatable in parallel planes of rotation and said engaging portions extend in directions normal to said planes of rotation.

3. A device as claimed in claim 1 or 2 characterized in that said portions of said opening and closing elements that stike each other are said engaging portions adapted for selectively engaging in said engaging opening.

4. The combination of recording and/or reproducing apparatus and a disk cartridge including a cartridge housing containing a disk as a signal recording medium, said disk cartridge being adapted for insertion into said recording and/or reproducing apparatus; wherein:

said cartridge housing is formed in an upper wall and a lower wall thereof with signal read or write apertures and a shutter member mounted movably on said cartridge housing so as to partially cover a front wall and said upper wall and lower wall of said cartridge housing;

said shutter member has an engaging opening formed therein;

said cartridge is insertable into the signal recording and/or reproducing apparatus along a predetermined path of insertion;

said recording and/or reproducing apparatus is formed with a pair of shutter member opening and closing elements mounted so as to be in said path of insertion of said disk cartridge, said shutter member opening and closing elements being rotatably mounted, having engaging portions adapted for selectively engaging in said engaging opening, and being rotated towards each other in response to a force applied by said disk cartridge when said disk cartridge moves along said path of insertion;

said shutter member opening and closing elements being so designed that:

when said disk cartridge is improperly inserted in said recording and/or reproducing apparatus, neither of said engaging portions engages in said engaging opening and both of said elements are rotated at the same time towards each other, so that said engaging portion strike each other to inhibit further movement of each other and inhibit further movement of said disk cartridge along said path of insertion; and when said disk cartridge is properly inserted in said recording and/or reproducing apparatus, one of said engaging portions engages in said engaging opening and a corresponding one of said shutter member opening and closing elements is rotated with a time lag as compared to the other of said shutter member opening and closing elements, so that said elements miss each other and enable complete insertion of said disk cartridge.

* * * * *